United States Patent
Givental et al.

(10) Patent No.: US 11,888,883 B2
(45) Date of Patent: Jan. 30, 2024

(54) THREAT DISPOSITION ANALYSIS AND MODELING USING SUPERVISED MACHINE LEARNING

(71) Applicant: International Business Machines Corporation, Armonk, NY (US)

(72) Inventors: Gary I. Givental, Bloomfield Hills, MI (US); Aankur Bhatia, Bethpage, NY (US); Paul J. Dwyer, Pewaukee, WI (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 15/623,125

(22) Filed: Jun. 14, 2017

(65) Prior Publication Data
US 2018/0367561 A1    Dec. 20, 2018

(51) Int. Cl.
| | |
|---|---|
| *H04L 9/40* | (2022.01) |
| *G06N 20/00* | (2019.01) |
| *G06F 21/55* | (2013.01) |
| *G06N 5/04* | (2023.01) |

(52) U.S. Cl.
CPC ........ *H04L 63/1433* (2013.01); *G06F 21/552* (2013.01); *G06N 20/00* (2019.01); *H04L 63/1408* (2013.01); *G06N 5/04* (2013.01)

(58) Field of Classification Search
CPC .......................... H04L 63/1433; G06N 20/00
See application file for complete search history.

(56) References Cited

U.S. PATENT DOCUMENTS

| | | | |
|---|---|---|---|
| 9,516,053 B1 | 12/2016 | Coden et al. | |
| 9,690,938 B1* | 6/2017 | Saxe | G06N 3/045 |
| 10,091,231 B1* | 10/2018 | Gates | H04L 63/1433 |
| 2009/0099988 A1 | 4/2009 | Stokes et al. | |
| 2015/0067857 A1* | 3/2015 | Symons | G06N 5/043 726/23 |
| 2015/0172321 A1 | 6/2015 | Kirti et al. | |

(Continued)

OTHER PUBLICATIONS

IPCOM000243925d, "Analytic Forecasting of Future Electronic Cyber Threats with Deep Learning and Coevolutionary Strategies," Oct. 28, 2015.

(Continued)

*Primary Examiner* — Trang T Doan
(74) *Attorney, Agent, or Firm* — Aaron Pontikos

(57) ABSTRACT

An enhanced threat disposition analysis technique is provided. In response to receipt of a security threat, a threat disposition score (TDS) is retrieved. The threat disposition score is generated from a machine learning scoring model that is built from information about historical security threats, including historical disposition of one or more alerts associated with the historical security threats. The system augments an alert to include the threat disposition score, optionally together with a confidence level, to generate an enriched alert. The enriched alert is then presented to the security analyst for handling directly. Depending on the TDS (and its confidence level), the analyst may be able to respond to the threat immediately, i.e., without further detailed investigation. Preferably, the machine learning model is updated continuously as the system handles security threats, thereby increasing the predictive benefit of the TDS scoring.

26 Claims, 9 Drawing Sheets

(56) References Cited

U.S. PATENT DOCUMENTS

| | | |
|---|---|---|
| 2016/0364163 A1 | 12/2016 | Kamble |
| 2017/0063912 A1 | 3/2017 | Muddu et al. |
| 2017/0118240 A1* | 4/2017 | Devi Reddy .......... G06N 7/005 |
| 2017/0214708 A1* | 7/2017 | Gukal ................... G06F 16/285 |
| 2018/0083988 A1* | 3/2018 | Kataoka .............. H04L 63/1416 |
| 2018/0183827 A1* | 6/2018 | Zorlular .............. H04L 63/1416 |
| 2018/0248893 A1* | 8/2018 | Israel ...................... H04L 67/10 |

OTHER PUBLICATIONS

Santos et al, IPCOM000248565D, "Adaptive Learning Model for Application-Based Trust and Risk Scoring Using Consistent Profile Creation," Dec. 19, 2016.

Kumar et al, IPCOM000239081D, "Machine Learning Based Predictive Model for Analyzing the Sentiments in Short Text," Oct. 10, 2014.

Stiborek et al, IPCOM000238197D, "Realistic Simulation of Network Behavior for Evaluation and Self-Adjustment of Intrusion Detection System," Aug. 7, 2014.

* cited by examiner

FIG. 10

| AI Alert Details | | □☒✕ |
|---|---|---|
| Demo Customer | AI Alert ID: <u>1356944</u> | <u>RealtimeDynamicList_Rule_CombinationKey</u> |

Libraries & Museums

AI Alert key: P00000008027955_sec_real_ids     Started 05/09/2017 15:48:30 GMT and ended 05/12/2017 10:25:26 GMT on atl-stg-m
SIEM Vendor: XPS

Description

LOW VOLUME Source targeted 91 and also appears on the BadIPList. Triggering event in the category group: HTTP_Executable_Transfer.
Sources:
Destinations:
Event Names: HTTP_Executable_Transfer Event Names HTTP_Executable_Transfer Additional Data URL: /_e_t0geB.shtml
alertRecurrenceCount_30day: 10
alertRecurrenceCount_60day: 16
alertRecurrenceCount_90day: 16
alert_key: 00000008027955_sec_825_real_ids → alertRecommendedAction: CLOSE
alertRecommendedActionConfidence: 86.1% logFilterMatch: filterId=34, filterId=35, filterId=43
<u>show less</u>

Sources                                                    Destinations

THREAT DISPOSITION ANALYSIS AND MODELING USING SUPERVISED MACHINE LEARNING

BACKGROUND

Technical Field

This disclosure relates generally to cybersecurity offense analytics.

Background of the Related Art

Enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills. In particular, the ever increasing number of threats at scale requires automation in support of security analysts, who are responsible for preventing, detecting and responding to these threats. In most cases, the analyst must manually search through a wide range of data sources (some private, many public), review past threat events and how they were handled, check for duplicate events, currently open similar events and a knowledge database, etc., to determine an appropriate response procedure to handle this information. This process of data collection, analysis, and determining the final disposition of the alert, is time consuming and tedious for an analyst.

There are a variety of tools that exist for threat monitoring to analyze a wide range of data sources (including structured data, unstructured data, semi-structured data, and reference data) to identify patterns that are indicative of threats, security policy and control anomalies. When these threats and/or anomalies are detected, actionable alerts are created. In many cases, the number of alerts exceeds the capacity of the security analyst to effectively and efficiently handle them. Security Operations Center (SOC) analysts are responsible for this process, and this is typically done by taking a closer look at the raw data associated with the alert, including a review of both contextual data, as well as the raw data from the data sources that triggered the alert. As noted, this data collection and investigation is time-consuming, and it often requires complex correlation analysis. This fact correlation can include information that is general to the threat or anomaly, but it can also require very specific information about a customer, their assets, and any other special instructions the customer may have provided regarding the proper alert handling. Additionally, the security analyst may often need to do additional research to understand the nature of the threat, the vector of the attack, and so forth, to discern whether the target is truly vulnerable.

Once all known factors are considered, the security analyst must then determine the optimal disposition for a specific alert. There are a range of possible dispositions including, but not limited to identifying the alert as one of: a duplicate, a false positive, a currently open case, a new case (first of a kind), and a known alert. For each of these dispositions, there are also a range of actions that the analyst can recommend including, for example: closing the alert with no further action, holding the alert for further investigation, and escalating the alert for additional review. In each of these cases, the analyst also may be able to recommend the specific mitigation and remediation activities that are needed to deal with the alert.

It is known in the prior art to provide systems that can classify the severity of an alert, but typically these systems use static algorithms that simply calculate a score based on pre-defined attributes built into an alert rule. Moreover, these systems only provide pre-defined recommendations on the handling of the alert, and they do not include the ability to learn about the likely disposition of the alert.

BRIEF SUMMARY

The subject matter herein provides a mechanism and method to reduce the time required for security analyst alert investigation, preferably by enriching threat data with additional contextual information, with a primary goal being reducing alert disposition error rates. To this end, machine learning (ML) is used to augment a security threat monitoring platform. Preferably, the machine learning is trained using previously-handled alerts and, in particular, by analyzing historical disposition of these alerts. Preferably, these analytics supplement alert information to generate a data-driven threat disposition score (TDS) that helps the analyst characterize the alert he or she is analyzing, e.g., to determine the likelihood that is a false positive versus a potential security incident. As the machine learning continues, the accuracy of the TDS continues to increase as the system learns from SOC analyst actions (escalation vs. closing as false positive), as well as feedback on alert handling (e.g., from higher level security analysts on the actions taken by the front line security analyst. Over time, and as the machine learning adapts, the algorithms improve their accuracy and predict alert dispositions with high accuracy levels.

According to a first aspect of this disclosure, a method for threat disposition analysis is provided. The method begins in response to receipt of a security threat. In particular, upon receipt, a threat disposition score (TDS) is retrieved. The threat disposition score is generated from a machine learning scoring model that is built from information about historical security threats, including historical disposition of one or more alerts associated with the historical security threats. The system then augments an alert to include the threat disposition score, optionally together with a confidence level, to generate an enriched alert. The enriched alert is then presented to the security analyst for handling directly. Depending on the TDS (and its confidence level), the analyst may be able to respond to the threat immediately, i.e., without further detailed investigation. Preferably, the machine learning model is updated continuously as the system handles security threats, thereby increasing the predictive benefit of the TDS scoring.

According to a second aspect of this disclosure, an apparatus for processing security event data is described. The apparatus comprises a set of one or more hardware processors, and computer memory holding computer program instructions executed by the hardware processors to perform a set of operations such as described above.

According to a third aspect of this disclosure, a computer program product in a non-transitory computer readable medium for use in a data processing system for processing security event data is described. The computer program product holds computer program instructions executed in the data processing system and operative to perform operations such as described above.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 10 is a representative portion of a display screen showing an alert provided to an analyst using the technique of this disclosure.

DETAILED DESCRIPTION OF AN ILLUSTRATIVE EMBODIMENT

Figure 1:
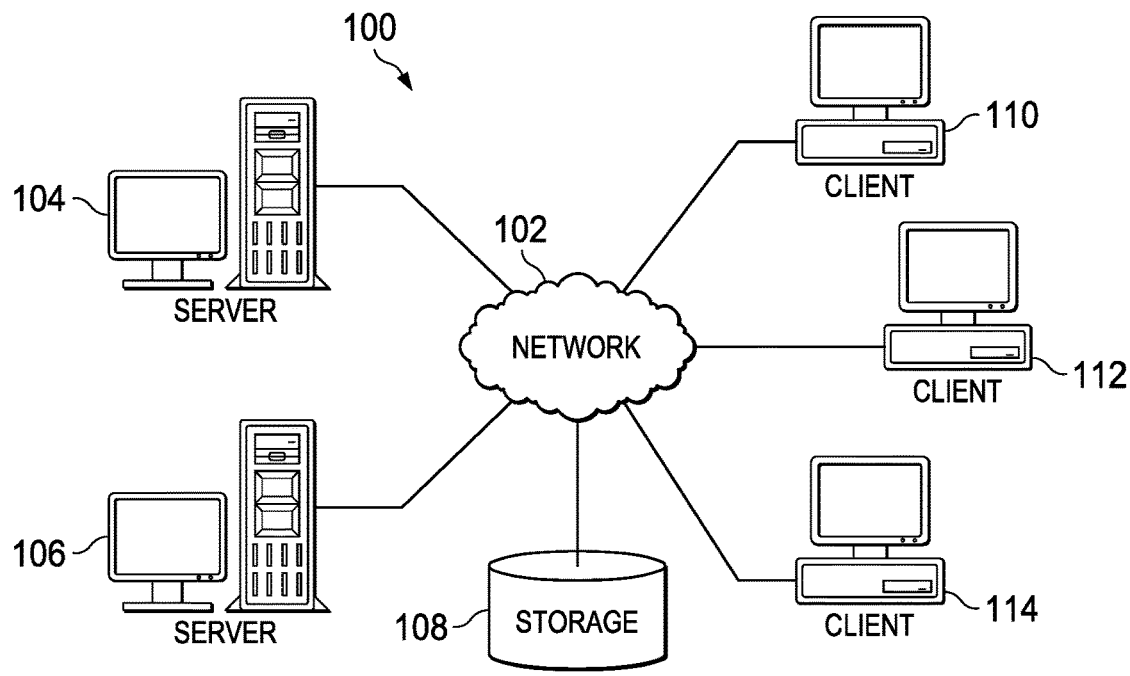
FIG. 1 depicts an exemplary block diagram of a distributed data processing environment in which exemplary aspects of the illustrative embodiments may be implemented.
Figure 2:
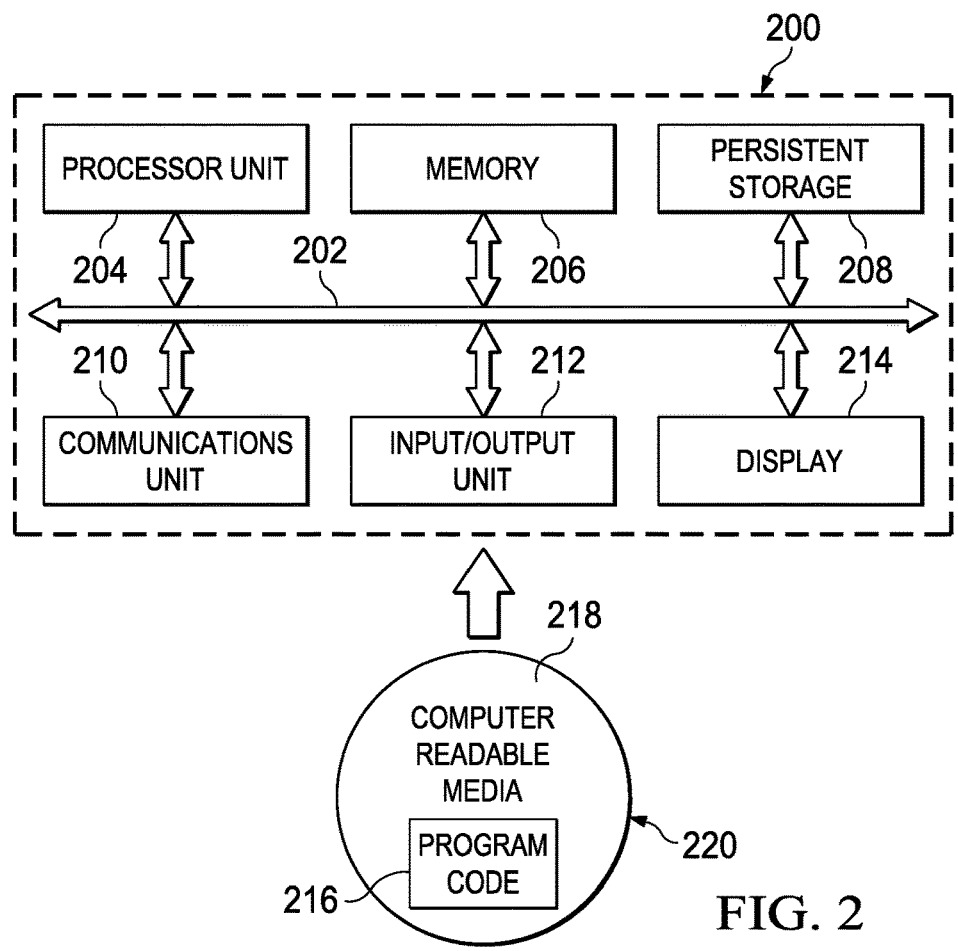
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
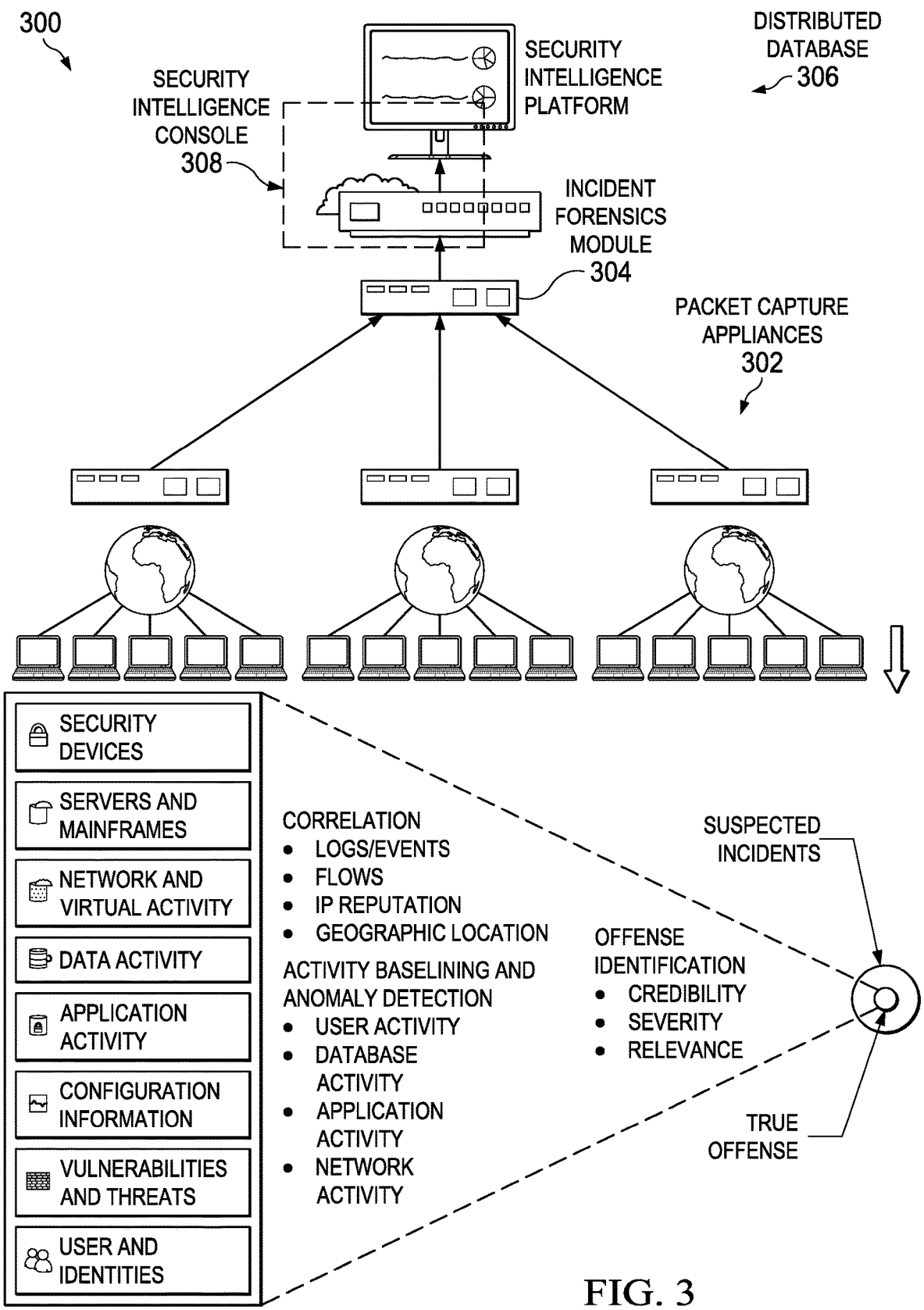
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Figure 4:
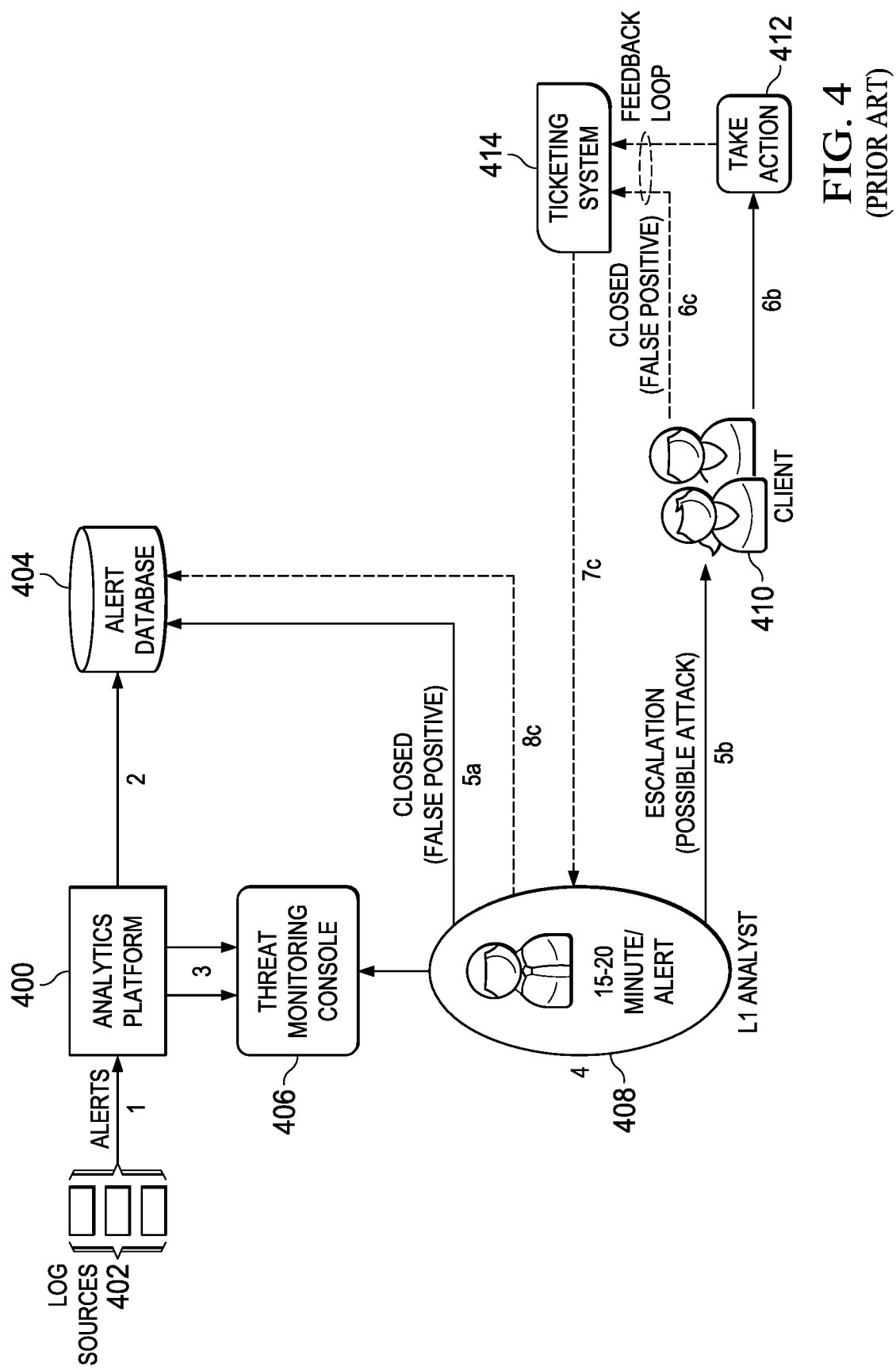
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

Threat Disposition Analysis and Modeling Using Supervised Machine Learning

With the above as background, the following describes a threat disposition analysis and modeling technique according to this disclosure. As will be seen, by using supervised machine learning as described herein, the time required for threat investigation prior to remediation response is significantly reduced.

Figure 5:
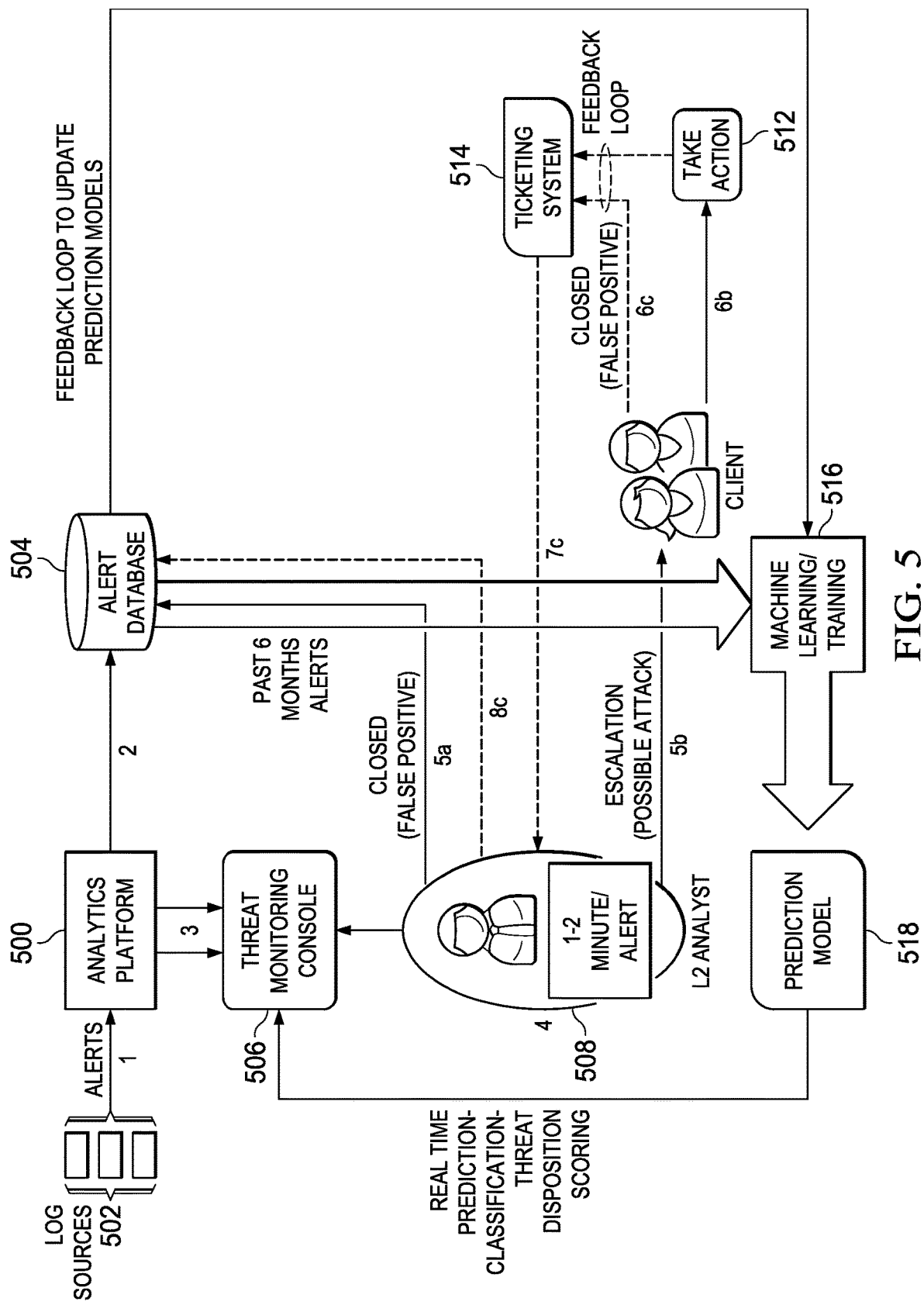
FIG. 5 depicts the technique of this disclosure wherein supervised machine learning is used to augment the security threat monitoring system in FIG. 4.

The preferred approach is depicted in FIG. 5, which depict how the L1 security threat monitoring technique in FIG. 4 is augmented with supervised machine learning according to this disclosure. FIG. 5 depicts a Security Operation Center (SOC) that provides Level 1 security threat monitoring using an analytics platform 500. Once again, the platform 500 receives alerts (at step (1)) from one or more log sources 502. At step (2), the alerts are stored to the alert database 504. At step (3), the alerts are provided to the threat monitoring console 506 that is manned by the L1 security analyst 510. The security analyst 508 interacts with the client 510, as previously described. In particular, and as depicted, the L1 analyst makes a finding regarding an alert, and a goal of the technique of this disclosure is to reduce significantly the time needed for the analyst to make his or her initial finding. As before, typically the finding closes the alert (step 5(a)) as a false positive, or escalates the alert (step 5(b)) as a possible attack. The false positive finding is stored in the alert database 504. The attack finding typically also is reported to the client 510 whose application is affected. Once again, and depending on the implementation (e.g., the SOC policy, the client procedure, etc.), some remediation or other action (step 6(b)) is taken; alternatively, the client 510 indicates that the alert is a false positive and thus should be closed (step 6(c)). The responsive action 512 is carried out, the information regarding the response to the alert provided to the ticketing system 514, and the information is reported back to the security analyst (step 7(c)), all as previously described. The security analyst updates the alert database (at step 8(c)) with the information about how the alert was handled (or otherwise closed).

Unlike the technique shown in FIG. 4, the approach of this disclosure uses machine learning techniques to enhance the threat disposition analysis. Machine learning (ML) algorithms iteratively learn from data, thus allowing computers to find hidden insights without being explicitly programmed where to look. Machine Learning is essentially teaching the computer to solve problems by creating algorithms that learn by looking at hundreds or thousands of examples, and then using that experience to solve the same problem in new situations. Machine Learning tasks are typically classified into the following three broad categories, depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, Linear Regression, Logistic Regression, Naive Bayes, and Neural Networks.

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning, which is the preferred technique used in the threat disposition analysis approach of this disclosure. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

To solve problem of supervised learning, one has to perform the following steps: Determine the type of training examples. Before doing anything else, the user should decide what kind of data is to be used as a training set. Gather a training set; the training set needs to be representative of the real-world use of the function. Thus, a set of input objects is gathered and corresponding outputs are also gathered, either from human experts or from measurements. The, determine the input feature representation of the learned function. The accuracy of the learned function depends strongly on how the input object is represented. Typically, the input object is transformed into a feature vector, which contains a number of features that are descriptive of the object. The structure of the learned function and corresponding learning algorithm are then determined. For example, the engineer may choose to use support vector machines or decision trees. The learning algorithm is then run on the gathered training set. Some supervised learning algorithms require the user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

Referring now back to FIG. 5, in this approach herein information collected in the alert database 504 is provided to a machine learning/training sub-system 516, which uses the information about alerts and prior alert handling to build a prediction model 518 that is then provided to the security analysts (e.g., via the threat monitoring console 506) to reduce the time needed for the security analyst to identify, categorize, prioritize and investigate events for the client(s).

In a preferred approach, and for each threat detected (e.g. by a SIEM, an enterprise security Tool, any other Big Data tool) and presented to the SOC analyst in the threat monitoring console 506 as an alert, the data associated with this alert is enriched using the historical information on how this alert has been handled previously. This enrichment is provided by the machine learning/training sub-system 516, which as noted above outputs the prediction model 518. Information from the model is summarized for the SOC analyst, typically in the form of a reified value, referred to herein as a threat disposition score (TDS). Preferably, the TDS is enabled by a set of one or more supervised machine learning (ML) algorithms. Without limitation, preferably the ML algorithm(s) create the prediction model 518 by taking into account data about historical alerts, e.g., what action the SOC analyst took on an alert (e.g., escalation, closing, holding for further analysis, etc.), any feedback on alert handling (e.g., from L2 or L3 analysts based on the L1 analyst action), as well as a variety of attributes regarding the nature of the alert itself. The system then continuously learns (e.g., from new inputs) to improve and update its training model 518 on a regular basis. As the richness of historical data grows, the ML algorithms in the machine learning/training sub-system 516 themselves evolve to become more accurate at scoring new threats. Preferably, this feedback loop is enhanced further by evaluating an effectiveness of a calculated TDS in comparison to a remediation action taken by the SOC analyst and vetted by feedback on alert handling (e.g., from L2 or L3 analysts). Thus, for example, a scenario in which a TDS was at odds with the remediation action taken allows the system to adjust and improve the training model 518, thereby improving performance (by further reducing the response time). As another example, when a higher level analyst responds to an escalated alert and determines a correct alert disposition (e.g. a L2 or L3 analyst affirms the alert is an actual threat or requests to close the alert even though it was escalated (i.e. false positive)), this valuable feedback is provided to the machine learning and reflected in an updated prediction model, thereby further improving the accuracy of the predicted alert disposition as indicated by the TDS.

Figure 6:
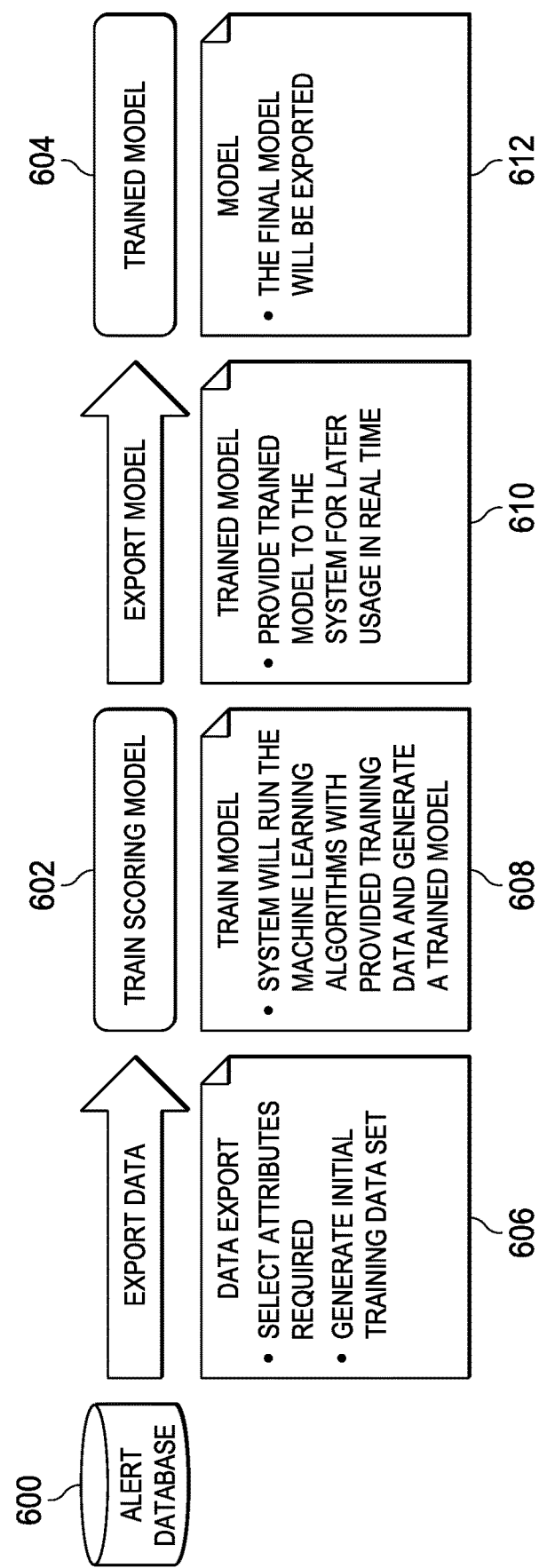
FIG. 6 is a high level process flow depicting how to create a scoring model according to this disclosure.

The prediction model is sometimes referred to herein as a scoring model. FIG. 6 depicts a technique for creating the scoring model according to an embodiment. Here, the alert database 600 is configured to export data to a train scoring model function 602, which comprises one or more machine learning algorithms. As depicted at 606, typically the data exported from the database 600 includes a set of attributes required in the model, as well as an initial training data set. Training (operation 602) involves running the machine learning algorithm(s) with the provided training set to generate an initial version of the model 604. The training is depicted at 608, and additional data from data sources external to the alert database may also be used to augment the machine learning. The resulting trained model 604, 612 is exported to the security threat monitoring system (operation 610).

Figure 7:
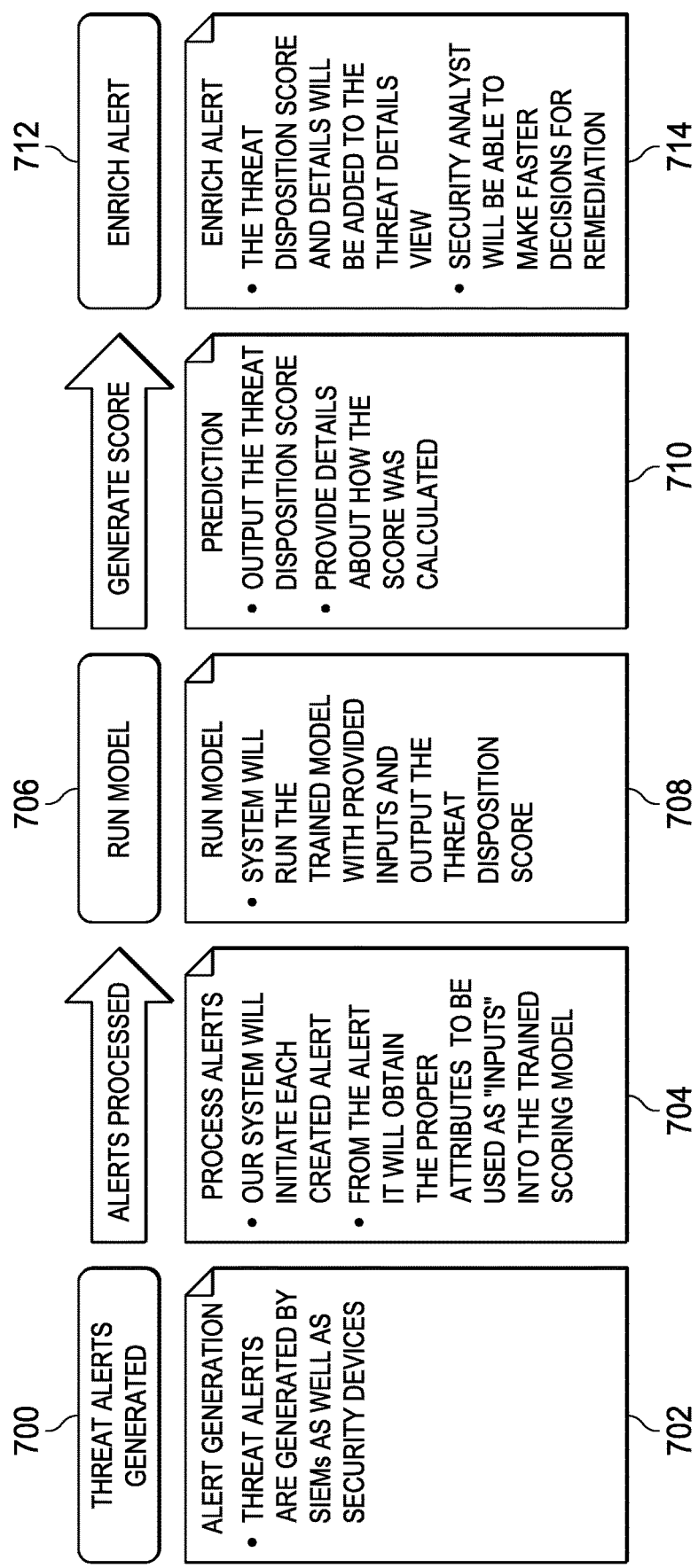
FIG. 7 is a high level process flow depicting how to use the trained model to facilitate alert disposition by the security analyst.

FIG. 7 depicts how the training model is used to facilitate reducing the time necessary for a security analyst to identify, categorize and handle the alert. At step 700, a generated threat alert is received for handling. As noted at 702, threat alerts are generated by the STEM, and other security systems and devices in the data center. At step 704, the system intakes the alert, and extracts a set of attributes to be used as inputs to the training model. At step 706, the training model is run against the attributes that are input; in response, a threat disposition score (TDS) is generated (step 708). At step 710, the system outputs a prediction, which typically comprises the TDS and information about how the score was computed. At step 712, the alert is "enriched" with this information, typically by provided the security analyst a threat details "view" (in the threat monitoring console, or otherwise). Using the alert that has been enriched in this manner, the analyst is able to make a more information decision about the alert, and much faster. This is depicted at step 714.

Figure 8:
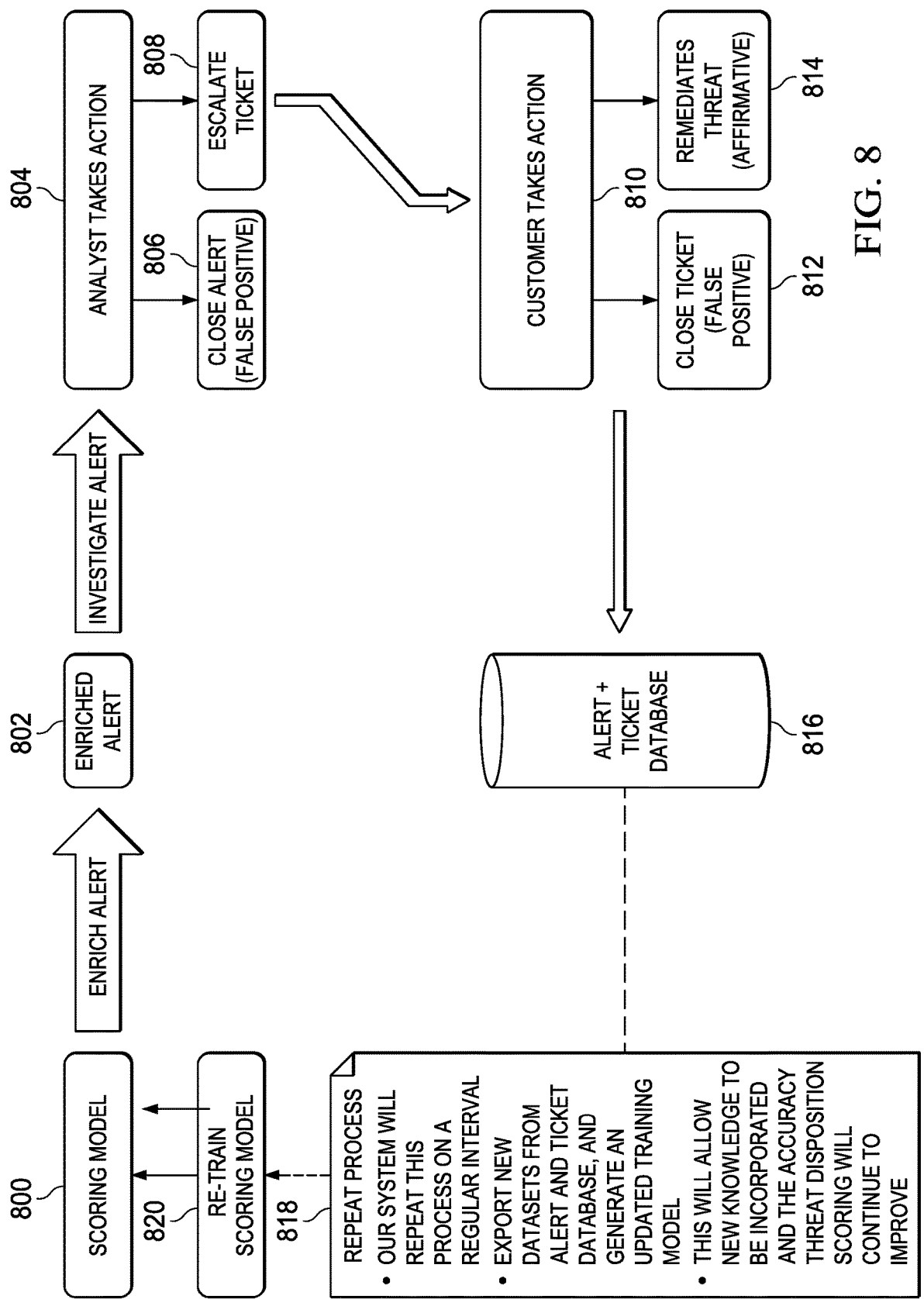
FIG. 8 is a high level process flow depicting how to update the scoring model.

FIG. 8 depicts how the scoring model is updated as learning is on-going. In the depicted scenario, the scoring model 800 is used to generate the enriched alert 802. As a result of viewing the enriched alert, the analyst has investigated the alert and taking an action 804, typically either closing the alert 806 (as a false positive), or escalating the issue 808. (Other options depending on the SOC implementation, policies and procedures, etc., may also be carried out). When the matter is escalated, the customer (directly or indirectly via the SOC or other system(s)) may take action 810, typically either to close the ticket 812 (as a false positive), or by remediating the threat 814. In either case, the action 810 is reported back (step 816) to the alert database, and optionally to a ticket database (and other monitoring and reporting systems). At step 818, and as the alert handling continues, the learning process is then repeated. The result is a re-trained (or updated) scoring model 820, which is then used going forward. The re-training/updating 818 may be carried out periodically, in response to given occurrences (a threshold of false positive alerts being reached), or some combination thereof. Preferably, the re-training of the scoring model occurs continuously as new data points (new alerts and their alert handling workflow) are received and stored in the alerts database.

Figure 9:
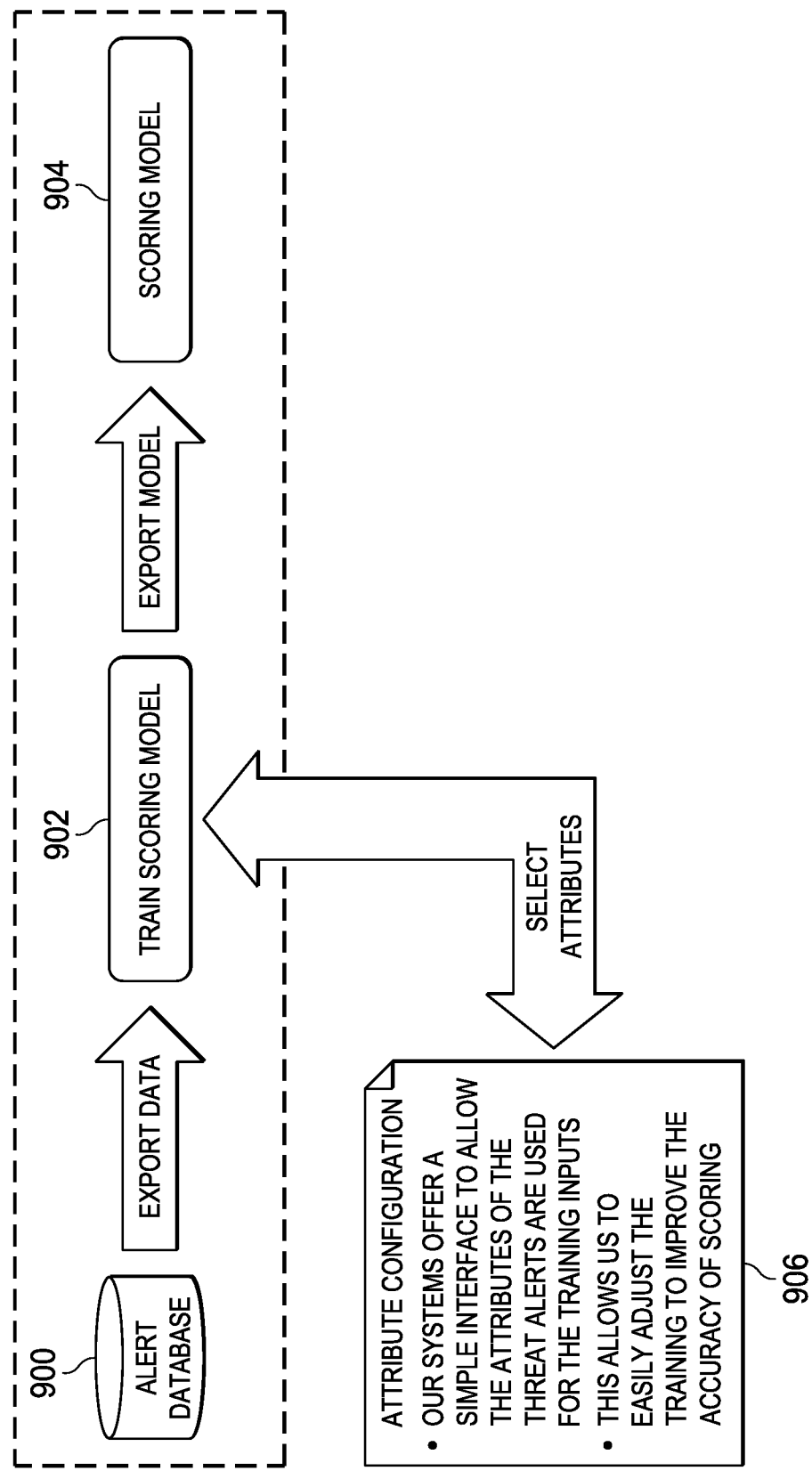
FIG. 9 is a high level process flow describing how to configure attributes for the TDS scoring model according to this disclosure.

FIG. 9 depicts how attributes for the training model are configured. As depicted, and as previously described, preferably the alert data (include historic data regarding alert handling) is exported from the alert database 900 and, at step 902, used by the machine learning algorithm(s) to train the scoring model 904. The particular attribute configuration 906 used for this purpose may be pre-configured (e.g., using a template, rule or policy) or user-specified (e.g., by a given security analyst at some level) using a simple GUI interface provided in the threat monitoring console. By configuring attributes in this manner, the training can be adjusted dynamically as the scoring model continues to be re-trained/updated. In one preferred approach, the system provides the analyst a set of drop-down configuration menus (or selections) from which the user configures which attributes should be considered for the training data set, with the goal of improving the threat disposition scoring accuracy.

Applying this approach here, a set of prediction models for training the machine may be generated as follows. Preferably, data set segregation involves developing a training set, a testing set, and selecting appropriate machine learning methods, such as random sampling without replacement. In one embodiment, feature selection for the training set includes a set of predictors (e.g., customer ID, rule names, alert creation time, source geo, destination geo, client industry, and event vendor), and a response variable (SOC alert status, e.g., closed or escalated). The machine learning models include, without limitation, one or more of the following: gradient boosting models (GBM), extreme gradient boosting (XGBOOST), and boosted classification trees (ADA). Representative tuning parameters include, without limitation, cross-validation using repeated sampling (e.g., using 10 repeats), slow and fast learning rates, a given number (e.g., 50, 100 and 150) trees, and a minimum number (e.g., 20) observations per node. Model performance may be evaluated in any known manner, e.g., for accuracy, sensitivity, specificity, positive and negative prediction rates, area under a receiver operator characteristic (ROC) curve, and the like. Known machine learning methods may be used for this purpose.

A threat detection score (TDS) may be absolute or relative, and it may be characterized by a number, a percentage, or the like. A particular TDS also typically has associated therewith a confidence value or level (e.g., high), as well as information detailing how the TDS was computed. For any particular threat that is the subject of an alert, an appropriate TDS is computed and output to the security analyst to facilitate the analyst identifying, categorizing and/or prioritizing the alert for response. As a particular TDS confidence level approaches some defined value (e.g. a configurable threshold), the system may then be controlled automatically to implement a given remediation or mitigation operation. Typically, alerts are classified by type, and there may a single TDS score associated with all alerts within a type, although preferably a TDS is associated to each alert including those that share an alert type.

Typically, there is a scoring model per alert type, but this is not required.

FIG. 10 depicts a representative alert screen provided to an analyst. In this example, the TDS is displayed via two values—"recommended action" and "recommended action confidence." These values work together to suggest to the analyst the recommended action for the Alert under investigation, based on the historically-trained model, together with the confidence of this recommendation.

The historical disposition data for an alert (or alert type) that is utilized during the machine learning may be quite varied, e.g., use case documentation, rule documentation, response procedure documentation, alert documentation, security incident documentation, security intelligence feeds documentation, contextual data, mitigation documentation (short term fix), remediation documentation (long term fix to prevent recurrence), previous errors, quality control data, feedback on alert handling (e.g., from other higher-level analysts), and combinations of the above.

The approach as described above provides significant advantages. Foremost, by providing the security analyst a TDS and supporting information, the time required for threat investigation and validation is significant reduced, especially in cases where the TDS has a high degree of confidence and, as a consequence, the analyst is then able to more readily and efficiently close the alert, e.g., as a false positive. As additional alerts run through the model and the model is updated, the system learns continuously, all without direct human intervention or any need to modify static scoring algorithms. Moreover, by providing the analyst (or some other permitted user) the ability to modify the configuration of the attributes of a particular threat alert, the scoring model is updated efficiently and as needed or desired, without any need to modify the system programmatically. As another advantage, and as noted above, as threat disposition scoring gets close to very high (e.g., close to 100%) confidence, the remediation of threat response may then be automated, eliminating the need for any further investigation or manual response. Another advantage is the improvement in the overall accuracy and reduced error rates that improve customer satisfaction. Over a period of time, this results in productivity improvements with reduced need to hire more analysts, even as alert volume increases.

By implementing the approach herein, and as noted above, a security analyst that receives a TDS (e.g., with an appropriate confidence level) need not even perform what might be considered a routine further investigation of the alert, and instead respond as if the investigation were already completed. Thus, by relying on the TDS, an analyst might respond to an alert immediately to the effect of "Escalate as a real attack" or "Close as false positive." The scoring model learns primarily based on attributes of the attack and, more importantly, on the knowledge (and context) available to the system based on prior similar activity, including how "close" a prior prediction may have been or how successful any final outcome might have been. Information about alert disposition outcomes preferably are returned to the system (e.g., by higher level analysts, by customers, or by other systems) and then used to further refine the scoring model. Thus, the security model may be updated to take into consideration any knowledge/context available regarding what the "final outcome" was with respect to a particular alert as previously vetted by an analyst and/or rated by the customer. The approach herein in effect predicts that given certain types of attacks and the related knowledge available to the system, that a particular alert represents a high (or low) probability of being a real threat. Because it is machine learning-based, the approach is primarily fully automated (with the exception of attribute configuration, which may be manually-supported), thus obviating manual investigation of the alert details for many type(s) of alert. Essentially, the approach enables the analyst to streamline his or her analysis and even in some cases to avoid having to do any intermediate analysis, instead providing an appropriate and timely response.

Generalizing, the technique provides for a platform that uses historical threat remediation and customer feedback data to enrich attack details for a Security Operations Center. The approach of enriching a threat alert with a machine learning-based threat disposition score (TDS) (and, optionally, associated supporting data) provides the security analyst with insight on an appropriate disposition for a received alert. As noted, the machine learning provides an extensive analysis of previous alerts, e.g., those that are of a similar type to the current alert being evaluated. By significantly reducing the analyst's time to resolve the alert, the technique provides significant productivity and threat disposition results over prior art techniques, such as static scoring algorithms that do not take into account historical context, feedback on alert handling from senior analysts, and so forth. Based on the threat TDS, the analyst is able to improve the accuracy of his or her handling on the alert, and the approach herein also reduces the amount of time needed to investigate an alert (e.g. when the alert is a false positive).

This subject matter may be implemented as-a-service. The subject matter may be implemented within or in association with a data center that provides cloud-based computing, data storage or related services. The machine learning (ML) functionality may be provided as a standalone function, or it may leverage functionality from other ML-based products and services including, without limitation, a Question-Answer based Natural Language Processing (NLP) system, products, device, program or process.

As noted above, the machine learning may utilize information in addition to the alert information drawn from the alert database. Thus, a machine learning algorithm may also take advantage of consolidated security and threat intelligence information from both structured and unstructured data sources. Structured data sources provide security and threat intelligence information about "what/who are bad," but typically such data sources lack in-depth knowledge about the threats, as well as actionable insights about how to address specific situations. Typically, structured data sources are carefully curated by domain experts. Examples include, without limitation, IBM X-Force Exchange, Virus Total, blacklists, Common Vulnerability Scoring System (CVSS) scores, and others. Unstructured data sources, in contrast, provide much more contextual information, such as why particular IP addresses or URLs are bad, what they do, how to protect users from known vulnerabilities, and the like. Examples of such unstructured data sources include, without limitation, threat reports from trusted sources, blogs, tweets, among others. Thus, the threat disposition analysis and modeling system of this disclosure may include a technique to consolidate security and threat intelligence information obtained from both structured and unstructured data sources.

In a typical use case, a SIEM or other security system has associated therewith a interface that can be used to render the TDS visually, to search and retrieve relevant information from alert database, and to perform other known input and output functions with respect thereto.

As noted above, the approach herein is designed to be implemented in an automated manner within or in association with a security system, such as a SIEM.

The alert information itself may be processed using a question and answer (Q&A) system, such as a natural language processing (NLP)-based artificial intelligence (AI) learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers. In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

Having described the invention, what we claim is as follows:

1. A method for threat disposition analysis, comprising:
responsive to receipt of a security threat identified in an alert, retrieving a threat disposition score (TDS), the threat disposition score generated from a machine learning scoring model built from information about historical security threats, including historical disposition of one or more alerts associated with the historical security threats, the TDS based in part on an effectiveness of a prior calculated TDS to predict a particular historical disposition associated with the alert;
augmenting the alert to include the threat disposition score to generate an enriched alert; and
presenting the enriched alert for further handling;
wherein the historical disposition of at least one alert comprises feedback from a second security analyst on handling of the at least one alert by a first security analyst.

2. The method as described in claim 1 wherein enriched alert also includes historical information about how the security threat has been handled previously.

3. The method as described in claim 1 wherein the feedback is generated following the at least one alert having been escalated from the first security analyst to the second security analyst.

4. The method as described in claim 1 further including building the machine learning scoring model, wherein the machine learning scoring model also is built from a set of attributes regarding an alert.

5. The method as described in claim 4 further including receiving data configuring the set of attributes.

6. The method as described in claim 1 further including updating the machine learning scoring model.

7. The method as described in claim 1, further comprising:
providing a confidence level associated with the TDS; and
responsive to the confidence level reaching a threshold, automatically performing a set of one or more actions to respond to the security threat.

8. The method as described in claim 1 wherein the further handling is one of: closing the security threat as a false positive, and escalating the security threat.

9. An apparatus, comprising:
a processor;
computer memory holding computer program instructions executed by the processor for threat disposition analysis, the computer program instructions operative to:
retrieve a threat disposition score (TDS) in response to receipt of a security threat identified in an alert, the threat disposition score generated from a machine learning scoring model built from information about historical security threats, including historical disposition of one or more alerts associated with the historical security threats, the TDS based in part on an effectiveness of a prior calculated TDS to predict a particular historical disposition associated with the alert;
augment the alert to include the threat disposition score to generate an enriched alert; and
present the enriched alert for further handling;
wherein the historical disposition of at least one alert comprises feedback from a second security analyst on handling of the at least one alert by a first security analyst.

10. The apparatus as described in claim 9 wherein enriched alert also includes historical information about how the security threat has been handled previously.

11. The apparatus as described in claim 9 wherein the feedback is generated following the at least one alert having been escalated from the first security analyst to the second security analyst.

12. The apparatus as described in claim 9 wherein the computer program instructions are further operative to build the machine learning scoring model, wherein the machine learning scoring model also is built from a set of attributes regarding an alert.

13. The apparatus as described in claim 12 wherein the computer program instructions also are operative to receive data configuring the set of attributes.

14. The apparatus as described in claim 9 wherein the computer program instructions also are operative to update the machine learning scoring model.

15. The apparatus as described in claim 9 wherein the computer program instructions also are operative to:
provide a confidence level associated with the TDS; and
responsive to the confidence level reaching a threshold, automatically perform a set of one or more actions to respond to the security threat.

16. The apparatus as described in claim 9 wherein the further handling is one of: closing the security threat as a false positive, and escalating the security threat.

17. A computer program product in a non-transitory computer readable medium for use in a data processing system for threat disposition analysis, the computer program product holding computer program instructions that, when executed by the data processing system, are operative to:
retrieve a threat disposition score (TDS) in response to receipt of a security threat identified in an alert, the threat disposition score generated from a machine learning scoring model built from information about historical security threats, including historical disposition of one or more alerts associated with the historical security threats, the TDS based in part on an effectiveness of a prior calculated TDS to predict a particular historical disposition associated with the alert;
augment the alert to include the threat disposition score to generate an enriched alert; and
present the enriched alert for further handling;
wherein the historical disposition of at least one alert comprises feedback from a second security analyst on handling of the at least one alert by a first security analyst.

18. The computer program product as described in claim 17 wherein enriched alert also includes historical information about how the security threat has been handled previously.

19. The computer program product as described in claim 17 wherein the feedback is generated following the at least one alert having been escalated from the first security analyst to the second security analyst.

20. The computer program product as described in claim 17 wherein the computer program instructions are further operative to build the machine learning scoring model, wherein the machine learning scoring model also is built from a set of attributes regarding an alert.

21. The computer program product as described in claim 20 wherein the computer program instructions also are operative to receive data configuring the set of attributes.

22. The computer program product as described in claim 17 wherein the computer program instructions also are operative to update the machine learning scoring model.

23. The computer program product as described in claim 17 wherein the computer program instructions also are operative to:
provide a confidence level associated with the TDS; and
responsive to the confidence level reaching a threshold, automatically perform a set of one or more actions to respond to the security threat.

24. The computer program product as described in claim 17 wherein the further handling is one of: closing the security threat as a false positive, and escalating the security threat.

25. A security threat analysis platform, comprising:
one or more hardware processors;
a data store holding a knowledge base of alert data, and historical alert disposition handling information; and
computer memory storing computer program instructions configured to;
compute a scoring model by applying machine learning to information derived from the knowledge base, the information including historical security threats, including historical disposition of one or more alerts associated with the historical security threats;
respond to receipt of a new security threat, using the scoring model to generate an alert having an associated threat disposition score and confidence level, the threat disposition score based in part on an effectiveness of a prior calculated threat disposition score to predict a particular historical disposition associated with the alert;
receive and respond to handling information for the alert;
wherein the historical disposition of the alert comprises feedback from a second security analyst on handling of the alert by a first security analyst.

26. The security threat analysis platform as described in claim 25, the alert having been escalated to the second security analyst from the first security analyst, and wherein the computer program instructions configured to receive and respond to handling information for the alert comprise computer program instructions further configured to:
  present the alert to the first security analyst responsible for addressing the new security threat;
  receive data indicating a response by the first security analyst to the alert, the response based at least in part on inclusion of the threat disposition score; and
  update the scoring model based at least in part on the response by the first security analyst to the alert;
  wherein inclusion of the threat disposition score reduces an alert disposition error rate associated with the first security analyst.

* * * * *